United States Patent [19]

Corsmeier et al.

[11] 4,190,398
[45] Feb. 26, 1980

[54] GAS TURBINE ENGINE AND MEANS FOR COOLING SAME

[75] Inventors: Robert J. Corsmeier; James P. Rauf, both of Cincinnati, Ohio

[73] Assignee: General Electric Company, Cincinnati, Ohio

[21] Appl. No.: 803,167

[22] Filed: Jun. 3, 1977

[51] Int. Cl.² ............................ F01D 5/08; F02C 7/12
[52] U.S. Cl. .................................. 415/114; 60/39.08; 60/39.75; 416/96 A
[58] Field of Search ............... 60/39.08, 39.66, 266; 415/114; 416/96 A, 96 R; 165/159

[56] References Cited

U.S. PATENT DOCUMENTS

| | | | |
|---|---|---|---|
| 2,595,822 | 5/1952 | Uggerby | 165/159 |
| 2,659,529 | 11/1953 | Price | 60/39.08 |
| 2,675,671 | 4/1954 | Malgieri | 60/39.08 |
| 2,778,601 | 1/1957 | Eckert . | |
| 2,782,000 | 2/1957 | Ledinegg . | |
| 2,849,210 | 8/1958 | Turunen et al. . | |
| 2,868,500 | 1/1959 | Boulet | 60/39.66 |
| 2,883,151 | 4/1959 | Dolida . | |
| 3,300,965 | 1/1967 | Sherlaw et al. | 60/39.08 |
| 3,756,020 | 9/1973 | Moskowitz et al. | 60/39.66 |
| 4,041,697 | 8/1977 | Coffinberry et al. | 60/39.28 R |

OTHER PUBLICATIONS

TFE-731 Turbofan Engine Pamphlet, Garrett Airesearch, Jan. 31, 1974.

*Primary Examiner*—Robert E. Garrett
*Attorney, Agent, or Firm*—Robert C. Lampe, Jr.; Derek P. Lawrence

[57] ABSTRACT

The turbine blades of a gas turbine engine are individually cooled through the internal circulation of a fluid coolant by the thermosiphon principle. Each turbine blade has associated therewith a closed-loop coolant passageway which is rotatable with the turbine rotor disk and which, in one embodiment, passes through a heat exchanger borne by, and rotatable with, a rotatable lubrication duct. The blade internal coolant is placed in heat exchange relationship with engine lubrication oil within the heat exchanger. The heated lubrication oil is then placed in heat exchange relationship with the engine fuel and the fuel thus heated is burned in the combustor, thereby returning at least a portion of the heat removed from the turbine blades to the engine power cycle. The cooling system is designed for simplified blade removal and replacement and the entire turbine can be removed from the engine as a sealed unit. A secondary cooling system is provided as a backup in the unlikely event that cooling effectiveness of one or more of the blade coolant loop passageways is lost.

1 Claim, 13 Drawing Figures

GAS TURBINE ENGINE AND MEANS FOR COOLING SAME

BACKGROUND OF THE INVENTION

This invention relates to gas turbines and, more particularly, to a concept for efficiently cooling ultrahigh temperature turbine rotor blades.

It is well understood that gas turbine engine shaft horsepower and specific fuel consumption, which is the rate of fuel consumption per unit of power output, can be improved by increasing turbine inlet temperatures. However, current turbines are limited in inlet temperature by the physical properties of their materials. To permit turbines to operate at gas stream temperatures which are higher than the materials can normally tolerate, considerable effort has been devoted to the development of sophisticated methods of turbine cooling. In early turbine designs, cooling of high temperature components was limited to transferring heat to lower temperature parts by conduction, and air cooling was limited to passing relatively cool air across the face of the turbine rotor disks.

In order to take advantage of the potential performance improvements associated with even higher turbine inlet temperatures, modern turbine cooling technology utilizes hollow turbine nozzle vanes and blades to permit operation at inlet gas temperatures in the 2000° to 2300° F. (1094° to 1260° C.) range. Various techniques have been devised to air cool these hollow blades and vanes. These incorporate three basic forms of air cooling, either singly or in combination, depending on the level of gas temperatures encountered and the degree of sophistication permissible. These basic forms of air cooling are known as convection, impingement and film cooling. U.S. Pat. Nos. 3,700,348 and 3,715,170, assigned to the assignee of the present invention, are excellent examples of advanced turbine air-cooling technology incorporating these basic air-cooling forms.

However, the benefits obtained from sophisticated air-cooling techniques are at least partially offset by the extraction of the necessary cooling air from the propulsive cycle. For example, probably the most popular turbine coolant today is air which is bled off of the compressor portion of the gas turbine engine and is routed to the hollow interior of the turbine blades. Typically, the work which has been done on this air by the compressor is partially lost to the cycle. Additionally, as the cooling air circulates throughout the turbine blade it picks up heat from the metallic blades or vanes. When this heated cooling air leaves the turbine blades, perhaps as a coolant film, this heat energy is lost to the cycle since the hot gases are normally mixed with the exhaust gases and ejected from an engine nozzle. It would be desirable, therefore, to have a cooling system wherein a medium other than compressor bleed air is used and wherein the heat extracted by the cooling medium is put back into the cycle in a useful and practical manner.

A partial solution to the foregoing problems has been the suggestion of closed-loop cooling systems for turbine blades which may or may not also incorporate the concept of regeneration or recuperation to recover lost thermal energy. One such cooling arrangement which has been proposed, for example, is that of U.S. Pat. No. 2,782,000. In that patent, a closed-system steam thermosiphon is used to cool the turbine blades, the thermosiphon principle being that by which a coolant is caused to circulate throughout the hollow bores of a turbine blade under the pumping action of centrifugal force due to the difference in density between the heated coolant (steam) exiting the blade and the coolant (steam or water) entering it. Each blade is provided with its own thermosiphon which is associated with a cooler or heat exchanger which, in turn, is cooled by a second cooling medium such as water or air. However, the difficulties in fabricating the system, particularly the proposed fin-type heat exchangers, would preclude its practical application in aircraft gas turbines. Furthermore, the system requires the use of water (which is not normally available in an aircraft gas turbine engine environment) or compressor bleed air (with the same disadvantages discussed above) for the secondary coolant.

Another arrangement utilizing the closed-loop thermosiphon principle is that taught in U.S. Pat. No. 2,778,601 wherein hollow turbine blades are connected, via radially extending passages through the turbine disk, to a common, manifolded, fluid reservoir comprising a hollow turbine shaft and a coannular hollow feed tube. The disadvantages of this arrangement include the necessity of providing a pair of coannular hollow members for a single turbine stage. Since modern gas turbofan engines already incorporate as many as three coannular shafts without closed-loop thermosiphon cooling, the complexities of adding additional shafting for this purpose would be formidable indeed. Also, since all of the blades are manifolded at a common supply, a leak in one blade would result in a coolant loss in all blades. Still further, the disk passages tend to degrade the disk structural integrity, an important consideration in aircraft gas turbine engine design, and tend to increase its cost.

U.S. Pat. No. 2,849,210 teaches a turbine using the closed-loop thermosiphon principle wherein the hollow interiors are fluidly connected to an annular condensing chamber near the turbine disk bore by a plurality of tubes extending down one side of the disk between a manifolded vaporizing chamber associated with the blades and the manifolded condensing chamber. However, the loss of coolant from one blade would result in a loss of cooling capability for all blades. Also, recommended coolants are water, sodium, sulphur, potassium, mercury and fluorocarbons, none of which are normally available in gas turbine engines. Thus, additional weight would be added merely for the coolant, and it must be remembered that weight is another important consideration in aircraft gas turbine engine design. In an alternative embodiment, the patent teaches that the external coolant may be fuel or some of the compressed air which is fed to the engine combustor, in which instances at least a portion of the heat extracted from the turbine buckets would be returned to the gas turbine engine as usable energy. However, cooling a turbine blade by routing fuel through its hollow interior presents a potential fire hazard, and the use of compressor discharge air has the inherent disacvantages described above which the closed-loop system is intended to avoid.

Yet another cooling arrangement, for example, is that proposed in U.S. Pat. No. 2,883,151. In that patent the hollow turbine blades are again cooled by the closed-loop steam thermosiphon principle, with the rotor blade interiors communicating with longitudinally extending, coannular passages within the rotatable turbine shaft via radially extending passages through the turbine disc. The thermosiphon, in turn, is cooled by fuel circulating through another pair of coannular passages in a stationary stub shaft within the rotating shaft. Heat transfer is by convection between the rotating and stationary shafts. The difficulty of fabricating double coannular shafts is not insignificant. Other disadvantages which have been mentioned with regard to the previous systems include the manifolding of all blades to a common coolant supply, the proximity of fuel to the rotating hot turbine, and the degradation of integrity due to the radially extending bores therein.

One more arrangement, for example, is that of U.S. Pat. No. 3,756,020, wherein the turbine of a regenerative engine is cooled by a closed-system thermosiphon which passes through heat exchangers. These, in turn, are cooled by either fuel or air which are then routed to the combustor. However, the individual blade cooling circuits pass through the disc and are manifolded at the heat exchanger, thereby presenting disadvantages enumerated above.

It will therefore be appreciated that although the concepts of turbine cooling by the thermosiphon principle and regenerative engines are not new per se, a need exists for applying these concepts to an aircraft gas turbine engine in an efficient and reliable manner.

SUMMARY OF THE INVENTION

Accordingly, it is the primary object of the present invention to provide an aircraft gas turbine engine in which the turbine rotor blades are cooled to withstand the high temperature gases of combustion.

It is another object of the present invention to provide a turbine wherein the rotor blades are individually cooled by the closed-system thermosiphon principle.

It is another object of the present invention to provide an aircraft gas turbine engine wherein the heat is extracted from the rotor blades and returned to the engine power cycle as useful energy.

It is still another object of the present invention to provide a cooled turbine rotor wherein the cooling system does not disrupt the structural integrity of the turbine disc or rotor.

It is still another object of the present invention to provide a cooled turbine rotor wherein the hazards of fire due to the coolant medium are minimized.

It is yet another object of the present invention to provide a cooled turbine rotor wherein reliance upon heat transfer between relatively moving components is eliminated.

Yet another object of the present invention is to provide an aircraft gas turbine engine with a cooled turbine rotor wherein turbine cooling system is located at the minimum possible radius so that it does not adversely affect the starting balance of the rotor.

These, and other objects and advantages, will be more clearly understood from the following detailed descriptions, the drawings and specific examples, all of which are intended to be typical of, rather than in any way limiting on, the scope of the present invention.

Briefly stated, the above objectives are attained in an aircraft gas turbine engine by providing a turbine wherein the rotor disc bears a plurality of hollow turbine blades. These blades are each cooled internally by the circulation of steam in a closed-loop, single-phase thermosiphon system. Each blade is provided with an individual steam circuit which includes a passageway uniquely attached to the outer faces of the turbine rotor disk, each closed-loop passageway passing through a rotating heat exchanger which, in one embodiment, is borne by an engine lubrication duct. The heat absorbed from the blades by the steam is extracted by the engine lubricating oil which is routed from within the duct and through the heat exchanger into heat exchange relationship with the thermosiphon loop passageways. The lubricating oil is that which provides the usual engine lubrication function so that an additional coolant need not be carried by the aircraft. Subsequently, this oil is cooled by engine fuel or the fan bypass stream airflow (in a gas turbofan engine) in a stationary heat exchanger relatively remote from the turbine. The use of the fuel as the final heat sink produces a regenerative engine in that at least a portion of the heat removed from the turbine is reintroduced into the engine cycle as heated engine fuel. The effects of leakage are minimized since each blade has associated therewith its own individual closed-loop thermosiphon system and fuel is not used as the intermediate coolant.

In the event that a leak should develop in a blade or in a steam circuit which would eventually jeopardize the structural integrity of the blade, a secondary coolant system is provided. In the secondary coolant system, compressor bleed air is routed to the hollow interior of each blade, but compressor bleed airflow therethrough is normally precluded by a plug filling the entrance to the hollow blade interior. If the blade temperature should rise due to the unlikely loss of steam thermosiphon cooling effectiveness, the plug, having a lower melting temperature than the blade, would melt and cooling air would be forced into the blade hollow interior. Similar plugs through the blade airfoil portion would also melt to permit the coolant air to exit from the blade interior, thereby providing a through-flow of cooling air which, though probably insufficient to maintain an indefinite blade life capability, would suffice to sustain an aircraft mission until maintenance could be performed. The turbine rotor assembly which comprises the blades, disk, steam thermosiphon passageways and heat exchanger is designed in such a manner that it can be installed in and removed from the engine without rupturing the sealed steam thermosiphon system.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which are given by way of example with the accompanying drawings in which:

DESCRIPTION OF THE PREFERRED EMBODIMENT

Figure 1:
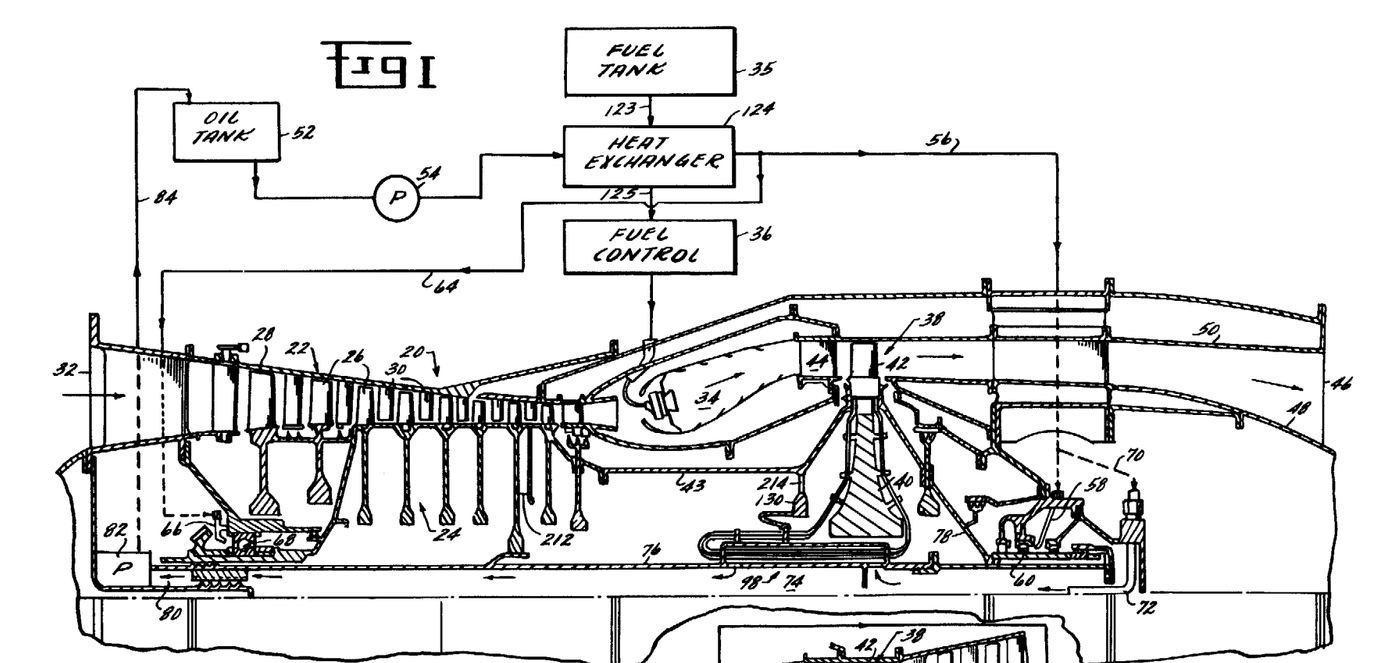
FIG. 1 is a partial cross-sectional view of an aircraft gas turbojet engine incorporating the subject invention and illustrating schematically the relationship of various engine systems.

Referring to the drawings wherein like numerals correspond to like elements throughout, attention is first directed to FIG. 1 wherein an aircraft gas turbojet engine depicted generally at 20 and embodying the present invention is diagrammatically shown. While it is recognized that turbojet engines are, by now, well known in the art, a brief description of the operation of the engine will enhance appreciation of the interrelationship of the various components in light of the invention soon to be described. Basically, the engine may be considered as comprising an axial flow compressor 22 having a rotor 24 bearing a plurality or rotatable blade rows 26 (rotors) and a compressor casing 28 bearing a plurality of stationary blade rows 30 (stators) interposed in alternating relationship with the rotor blade rows 26. Air enters compressor inlet 32, is compressed by the axial flow compressor 22, and then is discharged to a combustor 34 where it is mixed with fuel, supplied by means such as aircraft fuel tank 35 and an engine fuel control 36 of a type well known in the art and responsive to pilot throttle inputs, and burned to provide high energy combustion gases which drive a turbine rotor 38. Turbine rotor 38 comprises a turbine disk 40 bearing a plurality of turbine rotor blades 42, only one of which is shown for clarity, and drives, in turn, the compressor rotor 24 through interconnecting shaft 43 in the usual manner of a gas turbine engine. A stationary row of turbine nozzle vanes 44 orient the flow into the rotating turbine blades. A propulsive force, to the left in FIG. 1, is thus obtained by the discharge of combustion gases from a representative nozzle 46 defined, in part, by plug 48 and circumscribing shroud 50.

The engine of FIG. 1 is further provided with a lubrication system including an oil tank or reservoir 52 and a pump 54 which supplies oil under pressure through passage means such as conduit 56 and nozzles 58 to lubricate rear engine bearing 60, and also through conduit 64 and nozzles 66 to lubricate forward engine bearing 68. A portion of the oil is also pumped through passage 70 and nozzle 72 to the interior 74 of a rotatable oil duct 76 which is connected to turbine rotor 38 through frustoconical shaft 78 and is rotatable therewith. Duct 76 is slightly conical so as to act as a pump to deliver the oil into forward bearing sump 80 from which it is pumped through pump 82 back to the oil tank via conduit 84. The purpose for oil duct 76 will soon become apparent as the description of the invention becomes developed herein. However, it will be appreciated by those skilled in the art that some aircraft gas turbine engines are routinely designed with a center oil duct similar to duct 76 which as a conduit to carry and distribute the lubricant to various bearings. An example is that shown in U.S. Pat. No. 3,248,880, which is also assigned to the assignee of the present invention. Therefore, duct 76 or its equivalent may already be present in a gas turbine engine or may be added to the lubrication system, as here, for the purpose of the present invention.

Figures 3, 4:
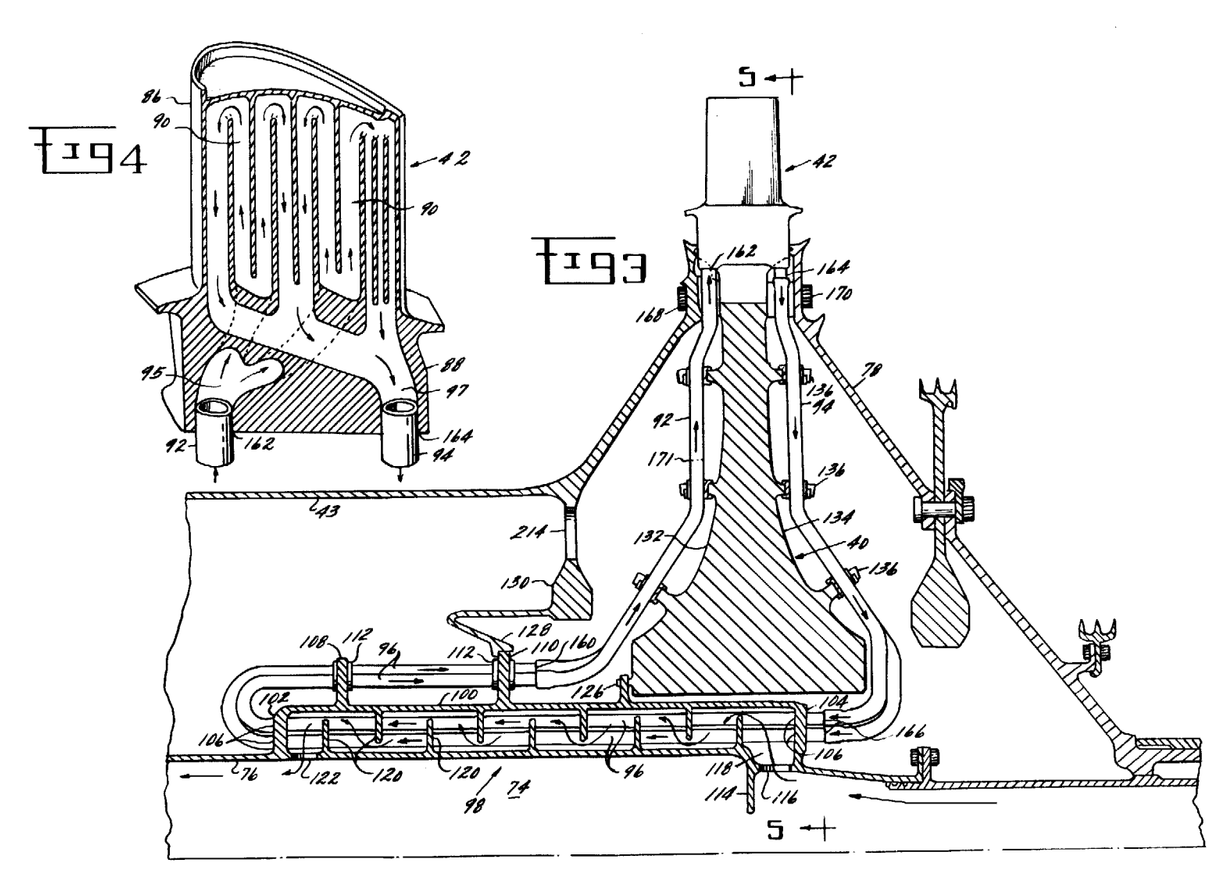
FIG. 3 is an enlarged cross-sectional view of the turbine portion of the engine of FIG. 1 depicting the closed-loop thermosiphon cooling system of the present invention in greater detail.
FIG. 4 is an enlarged cutaway view of the internal cooling circuitry of a turbine blade of FIG. 3.

Attention is now directed to FIGS. 3 and 4 wherein the turbine rotor portion of the engine of FIG. 1 is shown in greater detail. Turbine blades 42, borne about the perimeter of rotatable turbine disk 40, are provided with an aerodynamically contoured airfoil portion 86 and a base or root portion 88 for attachment to the disk, as by the well-known dovetail method (see FIG. 5). The relatively thin exterior walls of the airfoil portion define a substantially hollow interior in the form of serpentine passages 90. Connected to the forward and aft ends of the dovetail root 88 of each blade 42 are relatively thin-walled tubes 92 and 94, respectively, which communicate with the hollow interior of the blade through a pair of access openings; inlet 95 and exit 97. Tubes 92 and 94 are connected together by a U-shaped tube 96 to form a closed-loop passageway for each blade. Thus, the number of such closed-loop passageways equals the number of turbine blades in the turbine rotor.

Associated with oil duct 76, and rotatable therewith, is a heat exchanger 98 through which each closed-loop passageway, and more particularly, each tube 96, passes. This heat exchanger is annular in design, comprising an inner extremity defined by a portion of rotatable oil duct 76 and an outer concentric wall 100, with bulkheads 102 and 104 extending therebetween to define an interior cavity 118. The bulkheads are of sufficient thickness to preclude leakage around tubes 96 whether the joints 106 (where the tubes pierce the bulkheads) are brazed or swaged. Note that these joints 106 are exposed to facilitate visual inspection. Furthermore, bulkheads 102 and 104 could be of double-wall construction to assure an even better seal around tubes 96. Affixed to the outer wall 100 of the heat exchanger are two or more radial flanges 108, 110 which support the exposed portions of tubes 96. Wear collars 112 are fastened to tubes 96 where they are captured by flanges 108, 110 in order to prevent fretting of the tubes.

As discussed earlier, oil duct 76 is conical in order to pump oil therethrough by centrifugal pumping action. An inwardly extending annular dam 114 diverts at least a portion of the oil through introducing means such as a plurality of holes 116, only one of which is shown for clarity, and into the interior chamber 118 of heat exchanger 98. Inside heat exchanger are provided labyrinth means comprising, for example, a series of radial walls 120 which direct the oil over, under and around tubes 96 to absorb heat therefrom in a manner soon to be described. An alternative method of providing oil circulation would be to provide an Archimedean screw running through the interior of the heat exchanger for its entire length. In the embodiment of FIG. 3, the radial walls 120 provide further support for tubes 96 in the rotating environment. Means for discharging oil from the heat exchanger 96 comprises, for example, a second plurality of holes 122, again only one of which being shown for clarity. Oil thus re-enters the interior of oil duct 76 as indicated by the arrows in FIG. 3. To permit a constant flow of oil through the heat exchanger regardless of minor changes in engine attitude (for example, when an aircraft is in a climb or dive) the oil exit holes 122 are located at a higher radius than the oil inlet holes 116.

The present invention proposes means for cooling the turbine blades primarily by the thermosiphon principle with steam as a primary cooling medium, although it will become apparent that other coolants such as liquid metals (potassium and sodium) might be equally suitable in certain applications. The closed-loop system passageways comprising tubes 92, 94 and 96 and blades 42 may be partially filled with the coolant through any access port (not shown) which is subsequently plugged to conserve the sealed system. This means for cooling the blades operates as follows: if water is used as the coolant, it will turn to steam as the turbine rotor is operated at elevated temperatures. Since the steam density will vary with temperature, the steam which has been cooled by the heat exchanger 98 will be impelled radially outwardly through tubes 92 into the serpentine blade passages 90. As this steam circulates, it will pick up heat convected through the walls of the blade airfoil portion 86 and have its density reduced. This will cause the steam to travel radially inwardly through tubes 94 into the heat exchanger wherein the process is continuously repeated. The heat picked up by the steam as it passes through the blades is removed by the lubricating oil passing through the rotating heat exchanger in heat exchange relationship with tubes 96. The lubricating oil is subsequently directed, via means such as conduit 84, through a second heat exchanger shown in FIG. 1 at 124 wherein the oil and fuel to be burned in combustor 34 are maintained in heat exchange relationship with conduits 123, 125 comprising means for communicating between the fuel supply and the heat exchanger. Thus, at least a portion of the heat absorbed by the turbine blades id reintroduced back into the power cycle as heated fuel. The present concept of utilizing two heat exchangers, steam-oil heat exchanger 98 (means for cooling the steam) and oil-fuel heat exchanger 124 (means for cooling the oil), has an important advantage over prior art regenerative cooling schemes in that the fuel is maintained at a substantial distance from the hot turbine rotor section, thereby reducing the risk of serious fire in the event of leakage. Furthermore, the steam which circulates through the blades presents no fire hazard whatsoever.

It is important that the heat exchanger be firmly connected tangentially, axially and radially to the turbine disc 40 so as to assure that the turbine rotor disk, shaft 43 and oil duct 76 rotate as a system and to preclude steam tubes 92, 94 and 96 from bending stretching or twisting unnecessarily. To that end, means such as interlock 126 are provided between the turbine disk. 40 and the heat exchanger 98 to prevent the heat exchanger from rotating with respect to the disk. Additionally, positioning means such as, for example, a lip and rabbet 128 on structural member 130, which extends inwardly from turbine shaft 43, positions the heat exchanger radially and axially with respect to the turbine disk and shaft.

Referring now to FIGS. 3, 5 and 8–11, there is depicted a scheme for mechanically attaching tubes 92 and 94 to the outer faces 132, 134, respectively, of turbine disk 40 so as to prevent the heat generated by the steam from affecting the structural integrity of the disk. Note that these tubes pass outside of the disk and not through it so as to further enhance disk structural integrity. Furthermore, the method of mechanical attachment now to be described permits easy assembly and replacement of tubes 92, 94 and blades 40.

Means for retaining, such as a plurality of radially spaced rings 136, are formed integrally with disk 40 and extend generally axially from the faces thereof. These rings serve to support and position tubes 92, 94 axially, radially and tangentially with respect to the disk. As is best shown in FIGS. 8–11 where a portion of one such ring 136 is shown in greater particularity, each ring is provided with a plurality of circumferentially spaced D-shaped slots 138, equal in number to tubes 92 or 94 on the respective disk face and contoured to receive tube wear collars 140 which have been previously placed around the tubes 92, 94 and, possibly, affixed thereto as by brazing. Alternatively, resilient wear tubes could be provided where appropriate. The wear collars are provided with upper and lower lips 142, 144, respectively, which sandwich ring 136 and which serve to locate the tubes radially. These collars also protect the tubes from wear due to friction caused by engine vibration and thermal cycling. Once the collars 140 are installed in their respective D-shaped slots 138, means for locking, such as split locking ring 146, is inserted within a retaining groove 148 machined along the bottom edge of ring 136, preferably prior to machining of the slots 138. Locking ring 146 completes the capture of collar 140 and, in particular, constrains its axial movement. Radial movement of the locking ring is limited, in turn, by the base of slot 148.

Figure 5:
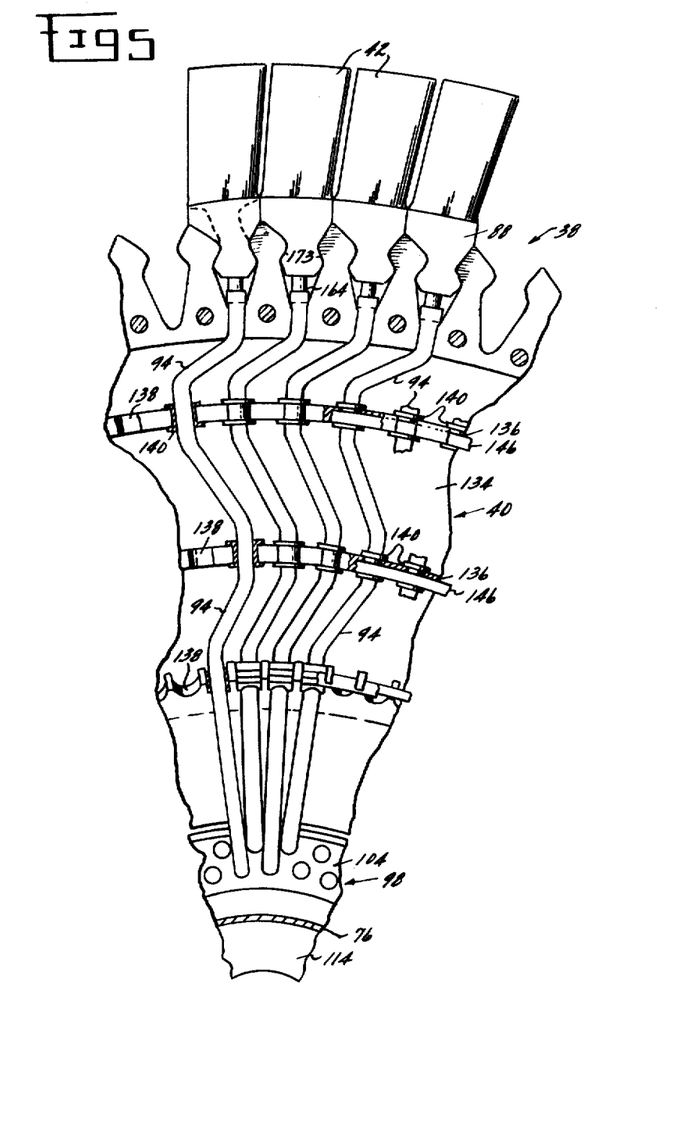
FIG. 5 illustrates an enlarged sector of the turbine as viewed along line 5—5 of FIG. 3, and depicts in more particularity the routing of the coolant passageways along the sides of the turbine disk.

As is best shown in FIG. 5, tubes 94 (and, similarly, tubes 92 on the other disk face) are formed with a series of S-shaped bends between each disk ring 136 and between the radially outermost ring 136 and blade roots 88. These bends provide flexibility to the tubes and prevent the formation of cracks therein due to the centrifugal force field and thermocycling. This flexibility is also desirable from an assembly standpoint due to the tolerance stackup of the blades, disk, tubes, wear collars and heat exchanger.

Figures 12, 13:
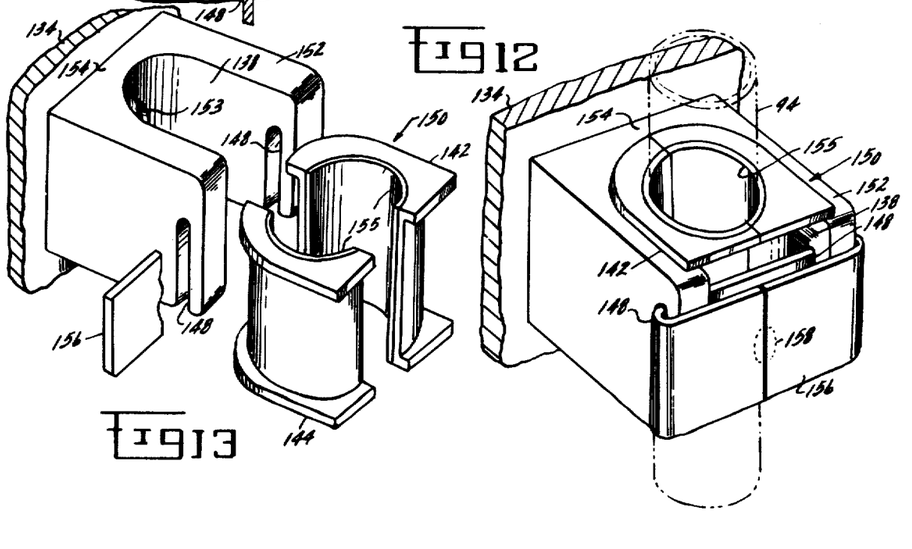
FIG. 12 is a view, similar to FIG. 8, of an alternative embodiment of the attaching means.
FIG. 13 is an exploded view of the attaching means of FIG. 12.

FIGS. 12 and 13 depict an alternative embodiment of the mechanical attachment of tubes 92 and 94 to their respective disk faces. Therein, a slightly modified collar 150 is split along its longitudinal axis into two halves which may be placed about the tubes prior to insertion into slots 138 of FIGS. 8–11. In all other respects, the function and assembly would be the same as that described above. However, the split collar affords more flexibility in assembly in that the tubes may now be bent prior to adding the collar instead of vice versa. Alternatively, rings 136 could be replaced with a plurality of U-shaped retainers 152 located in a ring, the number of which in each row being equal to the number of tubes as hereinbefore. Again, D-shaped slots would receive the collars of a type denominated as either 140 or 150 and the retainers would be attached to the disc faces as by bolts 153 (FIG. 13) through the base 154 of each U-shaped retainer. The split retainer ring 146 feature of FIGS. 8–11 could be retained as illustrated in FIG. 13 or else individual retaining bands 156 could be installed within the slots of each retainer 154, the ends of the bands being then crimped back 180° and tackwelded together as at 158. Additionally, a resilient liner 155 could be added to collar 150 for damping vibration between the tubing and the collar. While the mechanical attachments of FIGS. 8–13 have been illustrated with respect to their application to a rotating disk, it is clear that these attachments would be equally appropriate for attaching any tubing to any structure, stationary or rotating.

Referring again to the total turbine rotor cooling system as is best shown in FIG. 3, it becomes readily apparent that there are only four steam tube joints associated with each individual closed steam circuit and that all four are exposed for easy visual inspection. In particular, these joints are referred to as 160 between tubes 92 and 96, 162 between tube 92 and the inlet side of the root 88 of blade 42, 164 between the outlet side of the blade and tube 94, and 166 between tubes 94 and 96. Of course, if more or less tube segments are employed, the number of joints will increase accordingly. All joints are brazed or welded without subjecting the disk 40 to a furnace braze cycle which might materially reduce the high strength properties of the disk.

In fabricating the cooled turbine rotor, all but two of the joints are made prior to the installation of the disk. In particular, heat exchanger 98 with tubes 96, tubes 92 and blade 42 are assembled together and brazed as one unit. A dummy disk could be used as a fixture to hold these various components in their correct relative alignment during the brazing cycle. Thereafter, the joints would be pressure checked and the disk inserted axially into place. Then the other half of the tubes 94 would be installed and brazed using an induction coil at joints 164 and 166. After all of the steam joints are made and each blade's circuit pressure checked, a small amount of water (or other selected coolant) is added through an opening, not shown, in each circuit which is subsequently plugged to preserve the integrity of each sealed circuit. To complete the turbine rotor assembly, shafts 43 and 78 are bolted to the disk 40 as at 168 and 170, respectively (FIG. 3). After balancing, the assembly is ready for engine installation. Since the disk, tubes and heat exchanger are enclosed by shafts 43 and 78, windage losses from the tubes will not present a problem.

Replacement of a turbine blade is a relatively simple matter. First, the turbine rotor 38 is removed from the engine and shafts 43 and 78 disconnected therefrom. Tube 92 may be cut as at location 171 and tube 94 may be cut just below joint 164. Then the defective blade can be slid forward out of its dovetail slot 173 (see FIG. 5) and any residual coolant removed from the circuit. A replacement blade is then inserted into the dovetail slot and the tubes 92 and 94 reconnected using braze couplings. Coolant would then be added as with the original blade, and the turbine rotor balanced and reinstalled.

Figure 2:
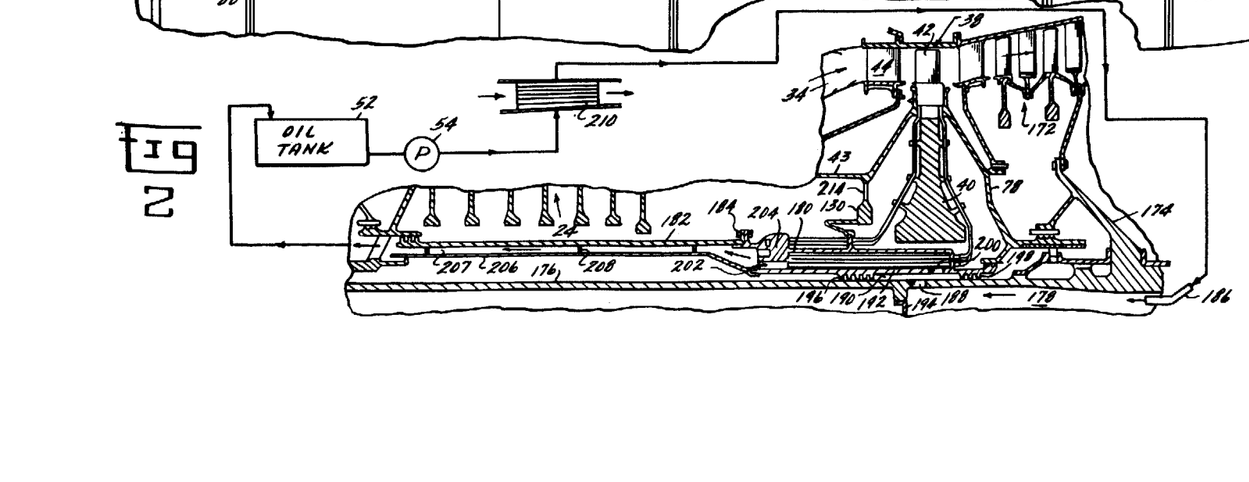
FIG. 2 is a partial cross-sectional view, similar to FIG. 1, depicting the adaptation of the subject invention to an aircraft gas turbofan engine of the dual-spool variety.

FIG. 2 illustrates how a somewhat similar steam thermosiphon system could be installed in an aircraft gas turbine engine of the two-spool turbofan variety, as opposed to the single-spool turbojet engine of FIG. 1. As is well understood in the art, the hot gases of combustion, after driving turbine rotor 38 (which in the terminology of turbofan engines is referred to as the high pressure turbine rotor), pass to and drive a second, low pressure turbine 172 which is typically of the multistage variety and which drives, in turn, a front-mounted fan (not shown) through frustoconical shaft 174 and an inner drive shaft 176. This inner drive shaft is hollow, defining to its interior a lubricating oil (coolant) passage 178. A slightly modified heat exchanger 180 concentric with shaft 176 is connected to disc 40 and shaft 43 as discussed above, and each closed-loop blade coolant passageway similarly passes through this modified heat exchanger. A conical oil duct 182 is attached to the forward end of the heat exchanger as at bolted connection 184. Lubricating oil enters passage 178 through oil nozzle 186. A plurality of apertures 188 in drive shaft 176 permits the oil to flow into the annular space 190 between drive shaft 176 and the inner wall 192 of heat exchanger 180. Dam 194, at least partially spanning passage 178, diverts the oil into apertures 188. Windback seals 196, 198 on the inner diameter of the heat exchanger discourage the oil from running anywhere other than through a second plurality of apertures 200 in wall 192 and into the heat exchanger. Thus, apertures 188, 200 and annular space 190 constitute one example of means for communicating between the coolant passage 178 and heat exchanger 180. However, even if oil did work past the windback seals, it would merely run to the forward or aft engine sumps, not shown in FIG. 2. The oil discharges from the heat exchanger through means communicating between heat exchanger 180 and duct 182 comprising, for example, a series of apertures 202 in forward bulkhead 204. Inside of oil duct 182 and spaced between shaft 176 and duct 182 is an intermediate duct 206 carried by duct 182 through spacer webs 208 and defining a coolant annulus 206 in fluid communication with heat exchanger 180. Duct 206 prevents oil from dripping onto drive shaft 176 when the engine rotation stops. Thus, a system is presented for a gas turbofan engine wherein the heat exchanger, rotating at turbine disc 40 rotational speed is provided with a lubricant from an inner shaft 176 rotating at the low pressure turbine rotational speed. Thus, the closed-loop thermosiphon is equally applicable, with modification, to gas turbine engines of both the turbojet and turbofan variety.

Also depicted schematically in FIG. 2 is an alternative embodiment of the secondary heat exchanger. Whereas FIG. 1 teaches the use of an oil-fuel heat exchanger to recover at least a portion of the heat removed from the blades and to return it to the engine cycle as heated fuel, thereby functioning as a regenerative engine, it may be satisfactory in some applications to eliminate the regenerative feature, thereby simplifying the system. A gas turbofan engine is particularly well suited to using a radiator, shown schematically at 210 and located in the fan bypass duct (not shown), to remove the heat from the oil by placing it in heat exchange relationship with the fan bypass flow stream. In this embodiment, however, the heat would be lost from the cycle. Thus, it is preferable to use the regenerative system of FIG. 1 wherever practical.

Returning briefly to FIGS. 1 and 3, there is shown associated with compressor rotor 24 a radial inflow compressor stage 212 which is used to extract bleed air from the compressor. Some of this bleed air circulates inside shafts 43 and 78, obtaining access to the turbine disc through apertures 214 in structural member 130. This bleed air maintains the blade roots and the disk at a reduced temperature level and provides additional cooling for the individual steam thermosiphon circuits.

Figures 6, 7:
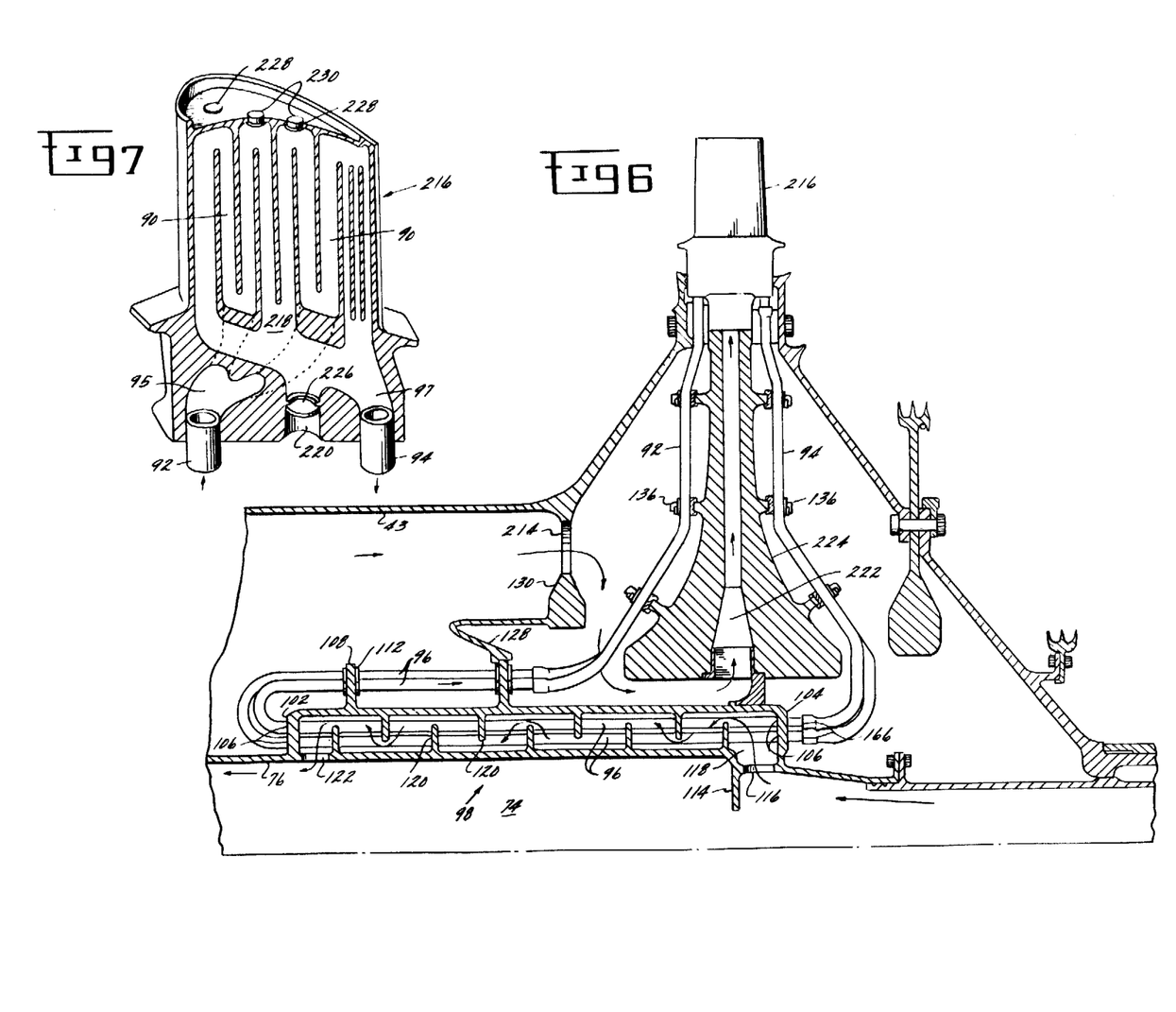
FIG. 6 is a view, similar to FIG. 3, illustrating an embodiment of the subject invention incorporating a secondary cooling system.
FIG. 7 is a view, similar to FIG. 4, showing the turbine blade internal cooling circuitry in the embodiment of FIG. 6.
Figures 8, 9, 10, 11:
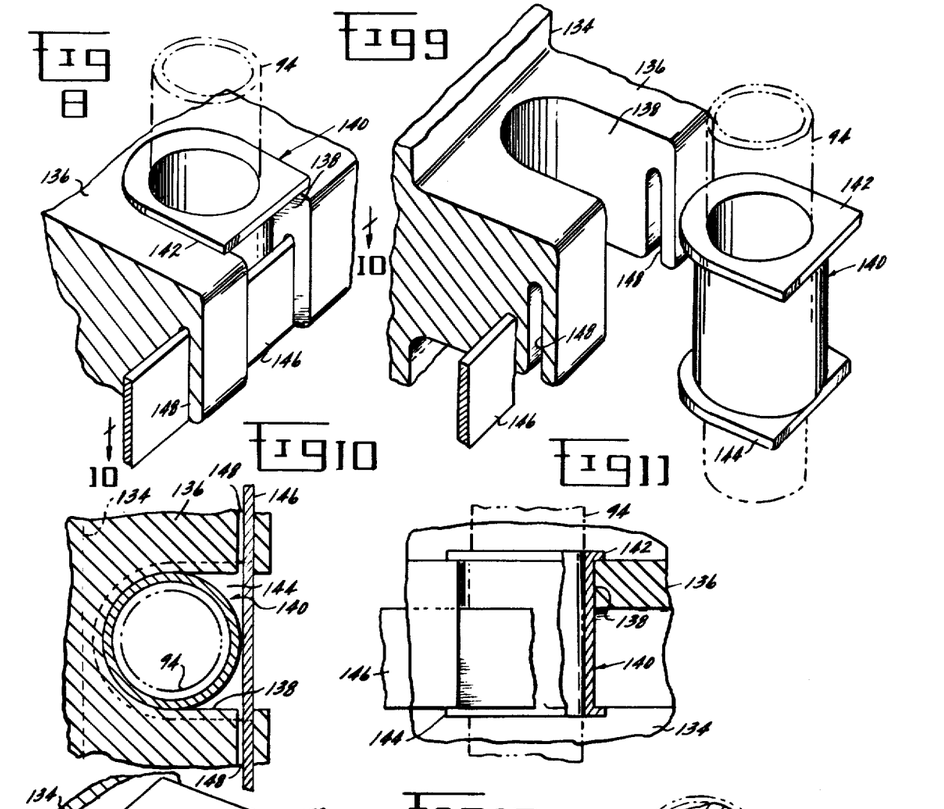
FIG. 8 is an enlarged isometric isometric view of a means for attaching the thermosiphon cooling passageways to the sides of the turbine disk of FIG. 3.
FIG. 9 is an exploded view of the attaching means of FIG. 8.
FIG. 10 is a cross-sectional view of the attaching means taken along line 10—10 of FIG. 8.
FIG. 11 is a plan view, partially in cross-section, depicting the attaching means of FIG. 8 in greater detail.

Attention is now directed to FIG. 7 wherein one embodiment of a unique secondary cooling system for the closed-loop thermosiphon cooled turbine is diagrammatically shown which utilizes this air bled from compressor rotor 24. This secondary cooling scheme is used to provide partial turbine blade cooling in the unlikely event of a steam thermosiphon circuit failure.

FIG. 7 shows a slightly modified turbine blade 216 which incorporates as its primary method of cooling the closed-circuit steam thermosiphon principle of FIGS. 3 and 4. Steam enters the hollow, serpentine interior 218 of the blade through tube 92 and exits via tube 94 as described above. However, the blade interior is also in potential fluid communication with a secondary cooling supply through bore 220 in the blade root. The secondary coolant supply comprises compressor bleed air which is drawn up into the blades through a conventional rim entry system (not shown) wherein each blade bore 220 is located proximate the turbine disk outer rim. Such a system is typified by U.S. Pat. No. 3,891,348 which is assigned to the assignee of the present invention and the subject matter of which is incorporated herein by reference. This secondary coolant air is prevented from entering the interior of the turbine blades under normal operating conditions by filling means such as a melt-out plug 226 which blocks bore passage 220. Plug 226 is fabricated of a material having a melting point less than that of the blade primary structure. Also associated with the blade are coolant discharge means, one form of which being casting holes 228 in the tip portion of the blade, the holes also being provided with filler means in the form of melt-out plugs 230. Like plugs 226, plugs 230 have a melting point temperature less than that of the primary turbine blade material. Under normal operating conditions, the blade would be cooled by the steam thermosiphon principle. In the event of failure of the primary steam cooling system which causes the temperature of a blade to rise, plugs 230 would melt. As the temperature increased even further, inner plug 226 would melt and secondary cooling air would rush into the blade interior and out through holes 228. While this secondary cooling system may not be sufficient to hole the blade temperatures to levels which would ensure long life, it would preserve the blade long enough to return an aircraft to a maintenance facility where repairs to the primary coolant system could be effected.

In an alternative embodiment shown in FIG. 6, the secondary cooling air could be drawn up through radially extending bores within slightly modified turbine disk 224. The fabrication and operation of such a bore entry turbine disk is described fully in U.S. Pat. Nos. 3,588,277; 3,742,706; and 3,982,852; which are assigned to the assignee of the present invention and the subject matter of which is also incorporated herein by reference. Essentially, bleed air is pumped radially outwardly through turbine disk bores 222 which communicate with blade bores 220. Yet another embodiment would be to cast a small secondary air-cooling circuit in the blade along with, but fluidly divorced from, the primary steam circuit. In all of these secondary cooling schemes it is recognized that the use of secondary cooling air is at the expense of engine cycle performance and efficiency. However, the dual-cooling approach offers the advantage of increased reliability.

It has now become apparent that the turbine blade cooling system described herein offers many advantages over prior art systems. For example, the steam-oil heat exchanger has been designed and placed in the engine in such a manner that it does not change the configuration or design of nearby hardware since it has been placed in an area which was otherwise vacant. Thus, it does not increase the engine length or diameter. Because it is located at the lowest possible diameter, the design is compact, lightweight, void of high stresses and has virtually no balance problems since all the blade coolant circuits have equal amounts of coolant. Other liquid-cooled turbines have suffered vibration problems because each blade or circuit was fed from a common source such as from a distributor or manifold. Additionally, the present invention employs conventional turbine disks and a common, safe, on-board, secondary coolant (oil) is used. The more volatile fuel coolants are divorced from the turbine rotor structure. The system employs conventional manufacturing techniques with relatively low-cost, long-life turbine blades. Minimum reliance is placed on precious compressor bleed air. However, means are provided to use this air in a secondary capacity as a back-up coolant system. The low diameter design is ideal for bringing this secondary cooling air in and out of the blades. Also, the system can be the basis for a regenerative engine with resultant decreases in engine specific fuel consumption. Finally, each blade is provided with an individual cooling circuit such that failure of one circuit would not necessarily jeopardize the entire turbine.

It should become obvious to one skilled in the art that certain changes can be made to the above-described invention without departing from the broad inventive concepts thereof. It is intended that the appended claims cover all such variations in the present invention's broader inventive concepts.

Having thus described the invention, what is claimed as novel and desired to be secured by Letters Patent of the United States is:

1. A turbine comprising:
   a rotor disk bearing a plurality of hollow blades;
   means, including a closed-loop passageway for each of said blades, for individually cooling each of said blades by the thermosiphon principle;
   a hollow duct including a conical coolant passage therein, said duct being rotatable with said disk;
   a heat exchanger, including an internal chamber, connected to and rotatable with said hollow duct, each of said closed-loop passageways passing through said heat exchanger chamber;
   means for introducing a coolant from said coolant passage into said heat exchanger chamber;
   labyrinth means for directing the coolant around said closed-loop passageways within said heat exchanger chamber;
   means for discharging the coolant from said heat exchanger chamber into said coolant passage; and wherein
   said coolant introducing means is located at a lesser radius of said coolant passage than said coolant discharge means.

* * * * *